United States Patent
Jun et al.

(10) Patent No.: US 7,248,312 B2
(45) Date of Patent: Jul. 24, 2007

(54) LIQUID CRYSTAL DISPLAY PANEL AND FABRICATING METHOD THEREOF

(75) Inventors: Jae Hong Jun, Seoul (KR); Jung Jae Lee, Gwanchun-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 217 days.

(21) Appl. No.: 10/873,491

(22) Filed: Jun. 23, 2004

(65) Prior Publication Data

US 2005/0007525 A1    Jan. 13, 2005

(30) Foreign Application Priority Data

Jul. 10, 2003    (KR) .................. 10-2003-0046762

(51) Int. Cl.
  *G02F 1/1335*    (2006.01)
  *G02F 1/1333*    (2006.01)
  *G02F 1/1339*    (2006.01)

(52) U.S. Cl. ................. 349/106; 349/110; 349/155; 349/156

(58) Field of Classification Search ............... 349/106, 349/155, 110, 156; 345/88
See application file for complete search history.

(56) References Cited

U.S. PATENT DOCUMENTS

| | | | |
|---|---|---|---|
| 6,208,401 B1 * | 3/2001 | Wen et al. | 349/155 |
| 6,424,402 B1 * | 7/2002 | Kishimoto | 349/156 |
| 6,567,139 B2 * | 5/2003 | Huang | 349/110 |
| 2004/0012750 A1 * | 1/2004 | Chung et al. | 349/155 |
| 2004/0263764 A1 * | 12/2004 | Kim et al. | 349/155 |

* cited by examiner

*Primary Examiner*—Huyen Ngo
(74) *Attorney, Agent, or Firm*—McKenna Long & Aldridge LLP

(57) ABSTRACT

A liquid crystal display panel and a method of fabricating the same are capable of simplifying a fabricating process and forming a spacer at a desired location. A liquid crystal display panel according to the present invention includes: a black matrix formed on an upper substrate; a color pattern having at least one hole on the black matrix; and a spacer protruding from the at least one hole.

16 Claims, 27 Drawing Sheets

LIQUID CRYSTAL DISPLAY PANEL AND FABRICATING METHOD THEREOF

This application claims the benefit of Korean Patent Application No. P2003-46762, filed on Jul. 10, 2003, which is hereby incorporated by reference for all purpose as if fully sent forth herein.

BACKGROUND OF THE INVENTION

1. Field of the Invention

The present invention relates to a liquid crystal display panel, and more particularly, to a liquid crystal display panel and a method of fabricating the same that are capable of simplifying a fabricating process and forming a spacer at a desired location.

2. Description of the Related Art

In general, a liquid crystal display (LCD) device controls the light transmittance of liquid crystal cells using an electric field, to thereby display a picture. To this end, the LCD device includes a liquid crystal display panel having liquid crystal cells arranged in an active matrix, and driving circuits for driving the liquid crystal panel. The liquid crystal display panel is provided with pixel electrodes and a reference electrode, i.e., a common electrode, to supply the electric field to each one of the liquid crystal cells. Usually, each pixel electrode is formed for each liquid crystal cell on a lower substrate, while the common electrode is formed as an integrated whole on the entire surface of an upper substrate. Each pixel electrode connects to a thin film transistor (TFT) that is used as a switching element. The pixel electrode together with the common electrode drives the liquid crystal cell in response to data signals supplied via the TFT.

Referring to FIG. 1, there is shown a liquid crystal display panel in accordance with a related art, which includes upper and lower array substrates 10 and 20 combined together, and a liquid crystal material 8 between the upper and the lower array substrates 10 and 20.

The liquid crystal material 8 rotates, in response to an electric field supplied thereto, to thereby regulate the transmittance of incident light via the lower array substrate 20.

The upper array substrate 10 includes a color filter 4 and a common electrode 6 formed on a rear surface of the upper substrate 1. The color filter 4 includes color filters of red (R), green (G), and blue (B) and makes it possible to display colors by selectively passing light having a specific band of wavelength. A black matrix 2 is placed between the color filters 4 adjacent each other and prevents the degradation of the contrast ratio by absorbing the light incident from the adjacent cells.

The lower array substrate 20 includes: a data line 18 and a gate line 12, which cross each other and are insulated by a gate insulating layer, formed on the entire surface of the lower substrate 21; and a TFT 16 at the crossing of the data and the gate lines. The TFT 16 includes: a gate electrode connected to the gate line 12; a source electrode connected to the data line 18; and a drain electrode facing to the source electrode with a channel portion including an active layer and an ohmic contact layer therebetween. The TFT 16 is connected to the pixel electrode 14 via a contact hole passing through a passivation film. In response to gate signals from the gate line 12, the TFT 16 selectively supplies data signals from the data line 18 to the pixel electrode 14.

The pixel electrode 14 is made from a transparent conductive material having a high light transmittance and is in a cell region defined by the data line 18 and gate line 12. The pixel electrode 14 generates a potential difference along with a common electrode 6 by data signals supplied via the drain electrode. Under the influence of the potential difference, the liquid crystal material 8 between the upper and lower substrates 1 and 21 rotates due to the dielectric anisotropy thereof. Hence, the light supplied via the pixel electrode 14 from the light source passes toward the upper substrate 1.

The cell gap between the upper and the lower array substrates 10 and 20 is maintained by spacers and a liquid crystal material is injected in the space maintained by the spacers.

Meanwhile, the spacers for maintaining the cell gap are formed by a fabricating method shown FIGS. 2A to 2D.

First of all, as shown in FIG. 2A, mixed material of solvent, binder, monomer, and photo-initiator is printed and dried so as to evaporate the solvent, and then spacer material 26a, which is a mixture of binder, monomer and photo-initiator, is formed. Here, either the lower substrate having the TFT and the pixel electrode or the upper substrate having the color filter may be used as the substrate 11.

After a photo-resist 32 is applied on the substrate 11 having the spacer material 26a formed thereon, a photo mask MS is aligned as shown in FIG. 2B. The photo mask MS includes a mask substrate 34 having an exposure area S2 which is an exposed area, and a shielding layer 36 formed on the mask substrate 34 to have a shielding area S1.

By carrying out the exposure process to selectively irradiate ultraviolet rays to the photo-resist 32 using the photo mask MS and the development process to develop the exposed photo-resist, a photo-resist pattern 38 is formed as shown in FIG. 2C. The spacer material 26a is patterned through an etching process using the photo-resist pattern as a mask, and consequently, a pattern spacer having designated height is formed as shown in FIG. 2D.

The pattern spacer 26 of the related art LCD occupies only about 2% of the area of the substrate 11. More than 95% of the spacer material 26a that has been printed on the entire surface of the substrate 11 to form the pattern spacer 26 is removed during the processes of exposure, development, and etching. So, the spacer material is inadvertently wasted, and the costs of dedicated material and fabrication become high. Further, the additional mask process for forming the pattern spacer 26 including the processes such as printing, exposure, development, and etching leads to the problem that makes the fabricating process even more complex.

In order to solve these problems, a fabricating method for the spacer using an ink-jet device has been suggested as shown in FIGS. 3A to 3C.

First, as shown in FIG. 3A, an ink-jet device 40 is aligned so as to overlap with the location where the spacer is to be formed on the substrate 11. Here, either the lower substrate 21 having the TFT 16 and the pixel electrode 14 or the upper substrate having the color filter 4 may be used as the substrate 11.

Then, the spacer material 26a is dispensed onto the substrate 11 from the ink-jet device 40 as shown in FIG. 3B. In other words, when an external voltage is supplied to a piezoelectric element of an ink-jet head, physical pressure is generated. This physical pressure causes a conduit connecting a tank 42 containing the spacer material 26a with a nozzle to contract and relax repeatedly, and thereby the spacer material 26a is dispensed onto the substrate 11 through a nozzle 46.

The pattern spacer 26 formed by being dispensed the spacer material 26a through the nozzle 46 of the ink-jet device thereafter undergoes an exposure to the ultraviolet ray radiated from a light source 48 or a firing process as shown in FIG. 3C, and then comes to have designated width W and height H.

During the formation of the spacer using the related art ink-jet device, the spacer material 26a of low viscosity experiences gravity while being dispensed onto the substrate 11. Due to gravity, the spacer material 26a spreads out widely with undesirably small ratio of height H to width W when dispensed onto the substrate. This leads to the problem that the pattern spacer 26 that overlaps with the black matrix 2 encroaches on an area outside the black matrix 2, i.e., a display area and appears as a stain on the display area.

SUMMARY OF THE INVENTION

Accordingly, a primary advantage of the present invention is to provide a liquid crystal display panel and a fabricating method thereof that are capable of simplifying a fabricating process and forming a spacer at a desired location.

In order to achieve these advantagess of the invention, according to one aspect of the present invention, a liquid crystal display panel includes: a black matrix formed on an upper substrate; a color pattern having at least one hole on the black matrix; and a spacer protruding from the at least one hole.

The color pattern has a structure having two layers.

The color pattern is formed by stacking a red color pattern, a green color pattern and a blue color pattern.

The color pattern has a width less than that of the black matrix.

A width of the color pattern narrows from an uppermost layer to a lowermost layer.

The color pattern may have an identical width in each layer.

A height of the spacer increases as the number of holes of the color pattern increases.

The liquid crystal display panel may include a common electrode located between the color filter and the spacer.

The spacer may be formed by using an inkjet system.

In order to achieve these advantages of the invention, according to one aspect of the present invention, a method of fabricating a liquid crystal display panel includes: forming a black matrix on a substrate; forming a color filter at each area partitioned by the black matrix; forming a color filter having at least one hole on the black matrix; and forming a spacer protuding in the at least one hole.

The color pattern may have a structure having two layers.

The step of forming the color pattern includes: forming a red color pattern on the black matrix; forming a green color pattern on the red color pattern; and forming a blue color pattern on the green color pattern.

The method of fabricating the liquid crystal display panel may further include forming a common electrode located between the color filter and the spacer.

BRIEF DESCRIPTION OF THE DRAWINGS

These and other advantages of the invention will be apparent from the following detailed description of the embodiments of the present invention with reference to the accompanying drawings, in which.

DETAILED DESCRIPTION OF THE ILLUSTRATED EMBODIMENT

Reference will now be made in detail to the preferred embodiments of the present invention, examples of which are illustrated in the accompanying drawings.

Hereinafter, the preferred embodiments of the present invention will be described in detail with reference to FIGS. 4 to 12.

Figure 1:
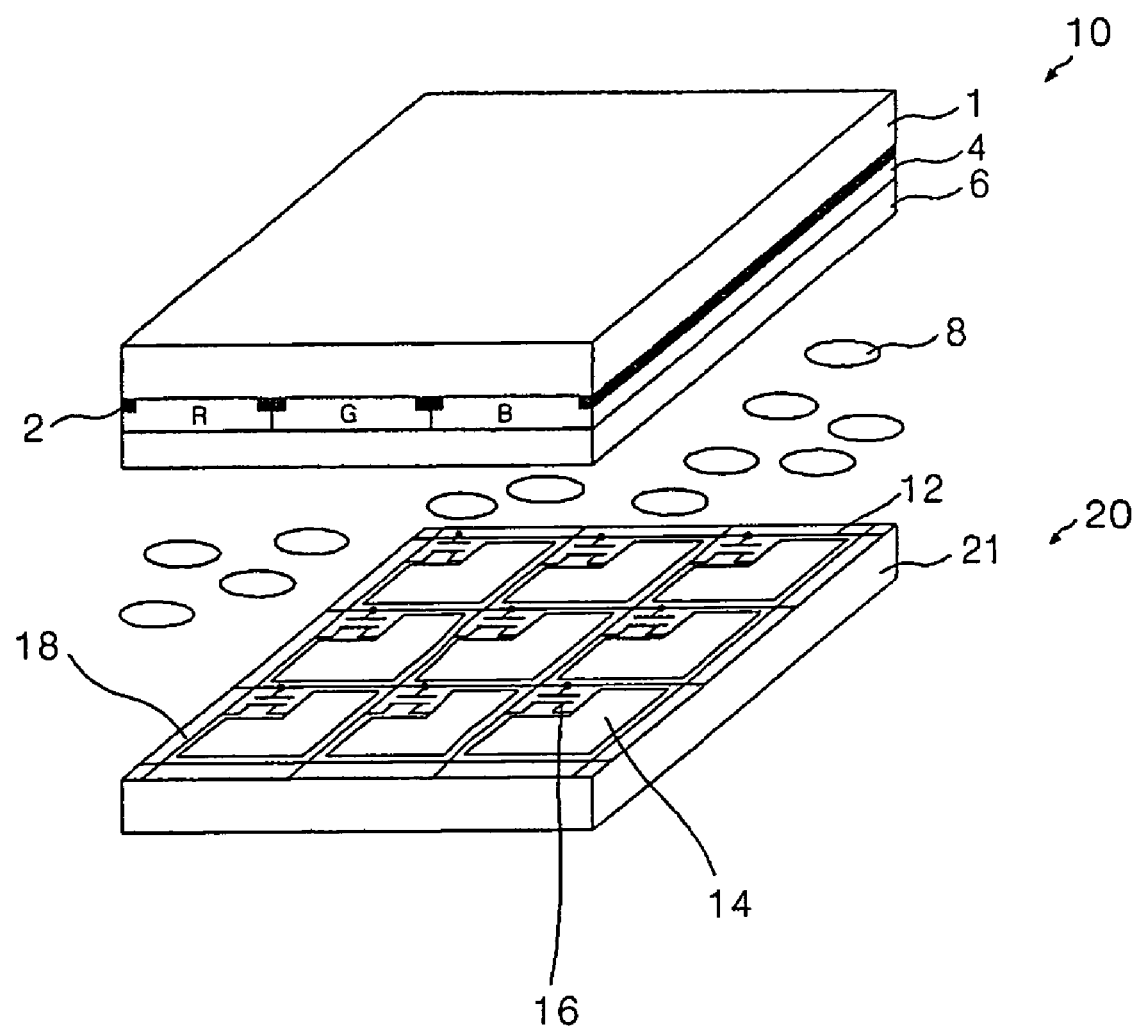
FIG. 1 is a perspective view representing a related art liquid crystal display panel.
Figure 2A:
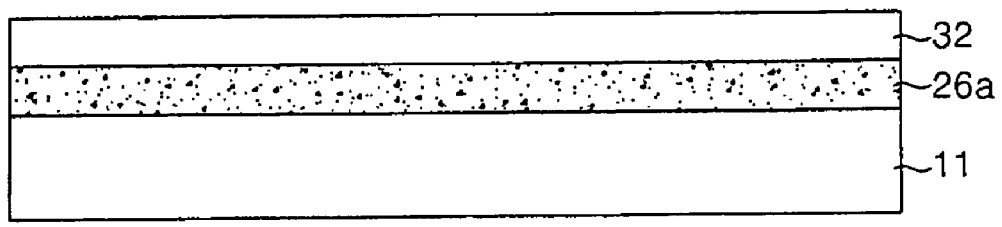
FIGS. 2A to 2D are sectional views representing a fabricating method of a typical pattern spacer.
Figure 2B:
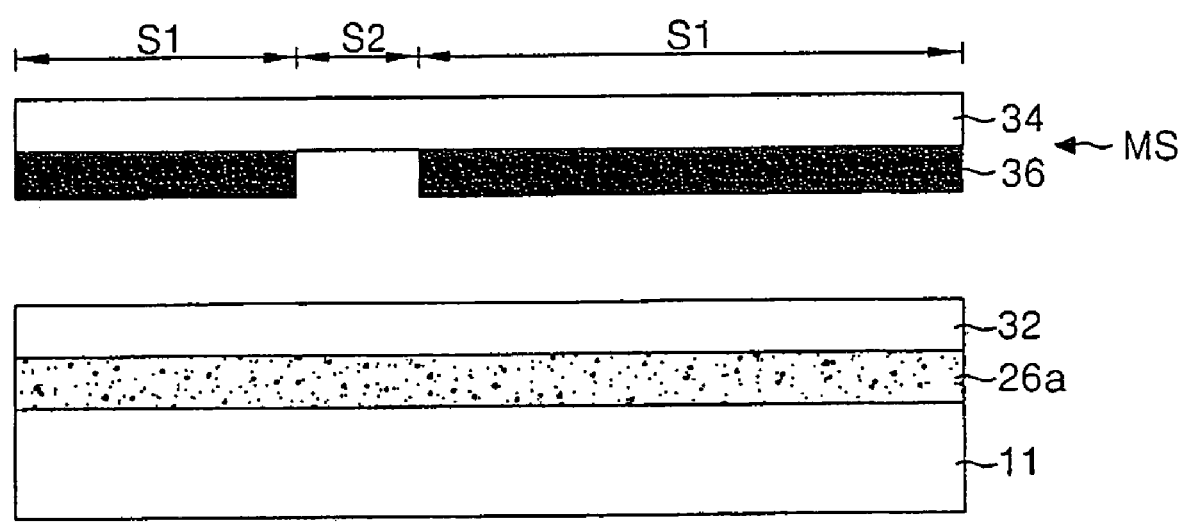
Figure 2C:
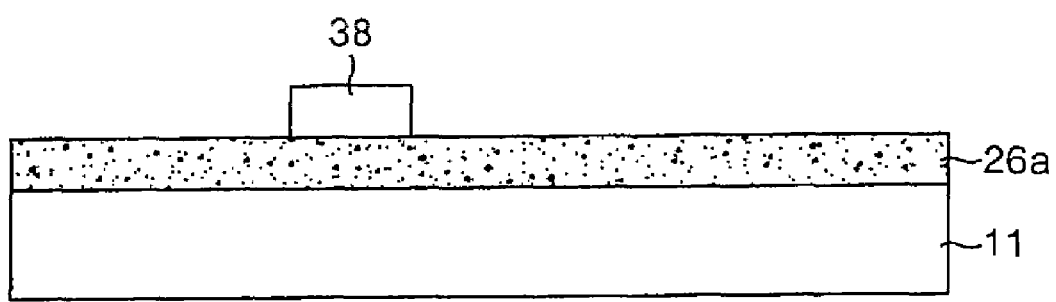
Figure 2D:
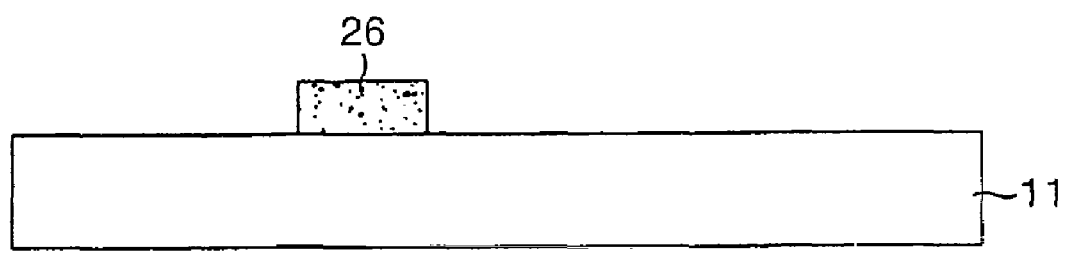
Figure 3A:
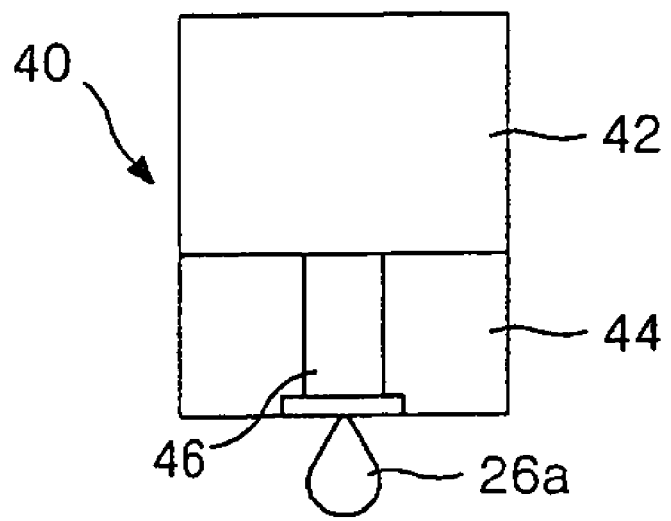
FIGS. 3A to 3C are configurations representing a fabricating method of a spacer using a related art inkjet device.
Figure 3A:
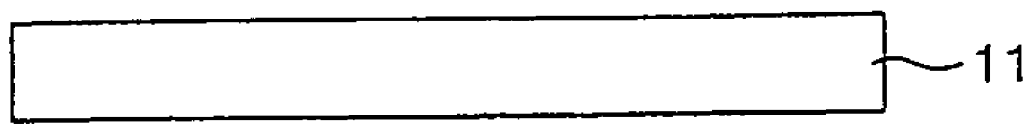
Figure 3B:
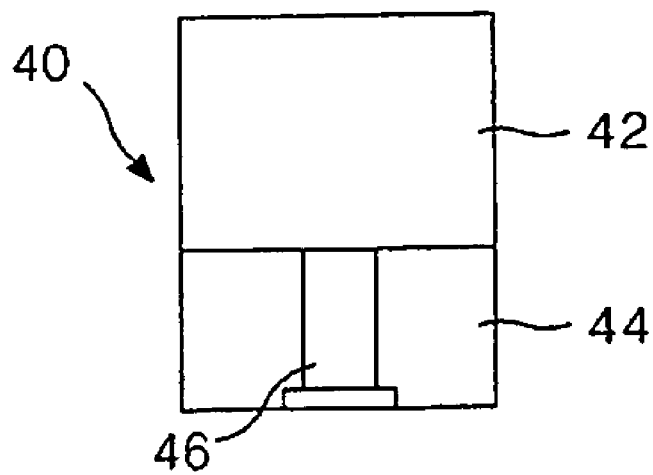
Figure 3B:
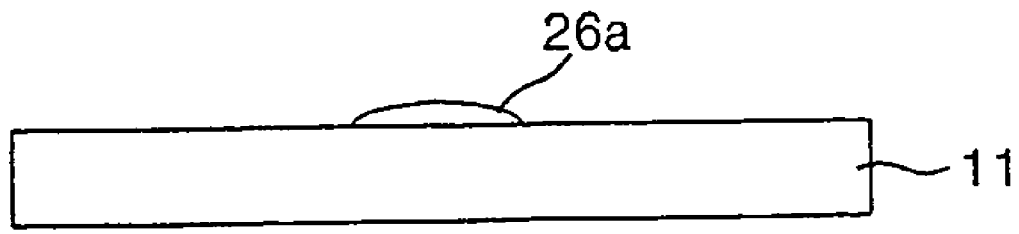
Figure 3C:
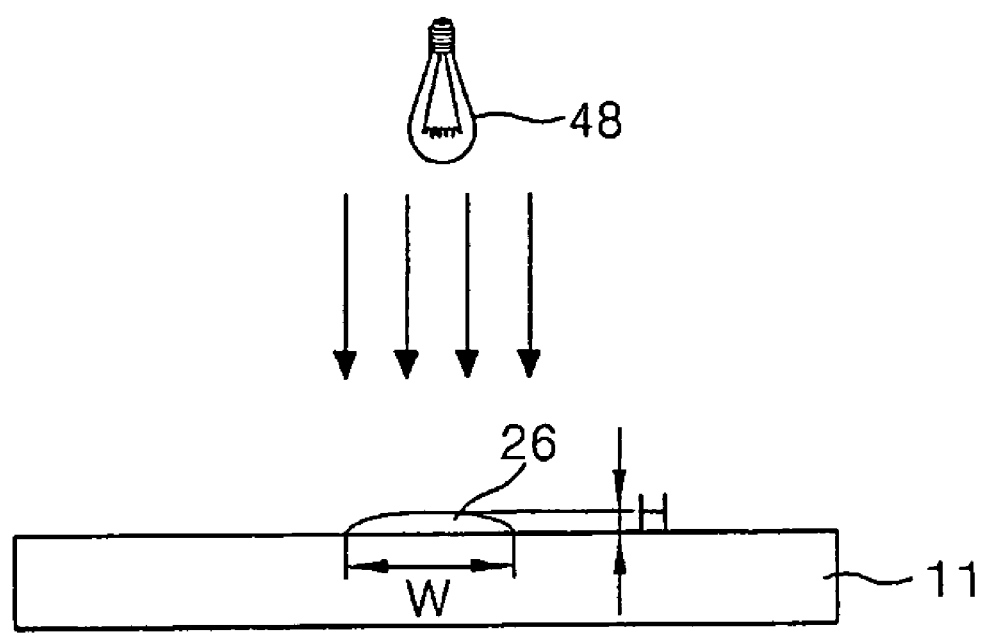
Figure 4:
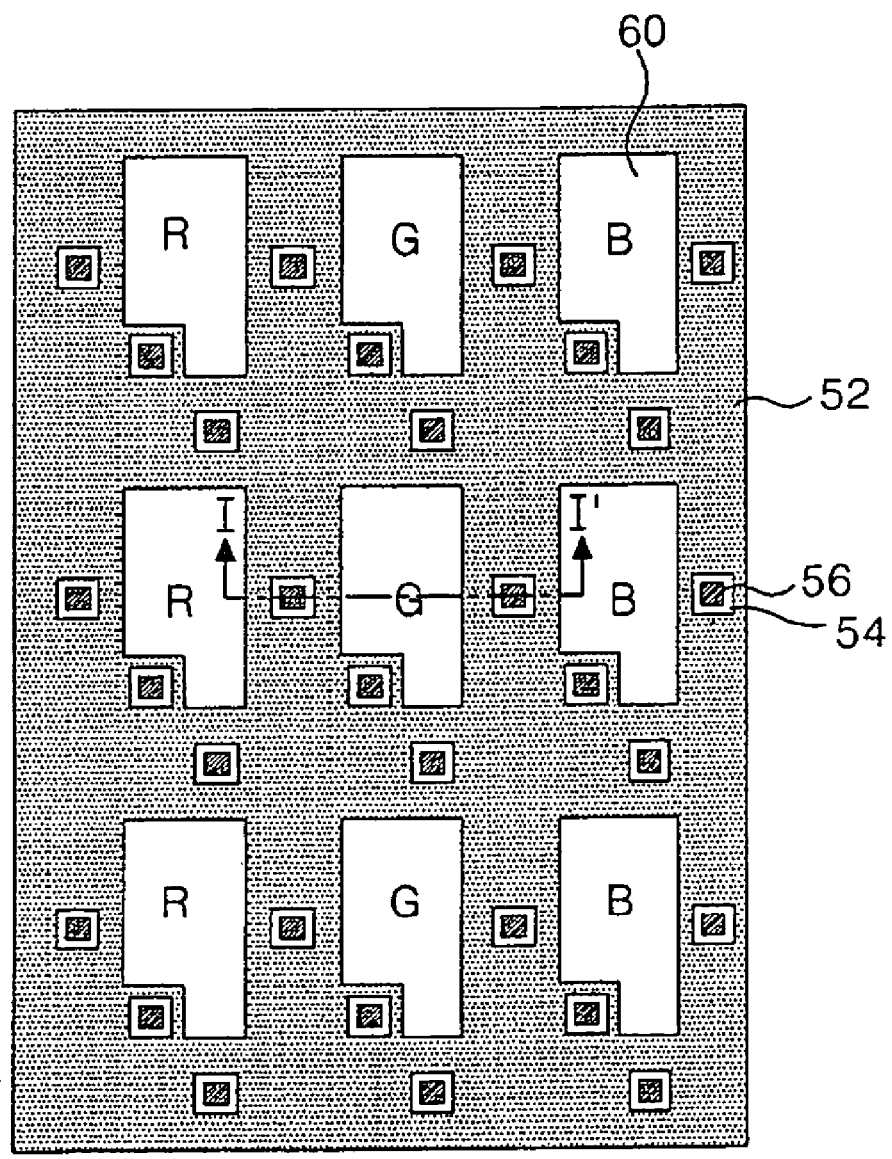
FIG. 4 is a plan view representing an upper array substrate according to a first embodiment of the present invention.
Figure 5:
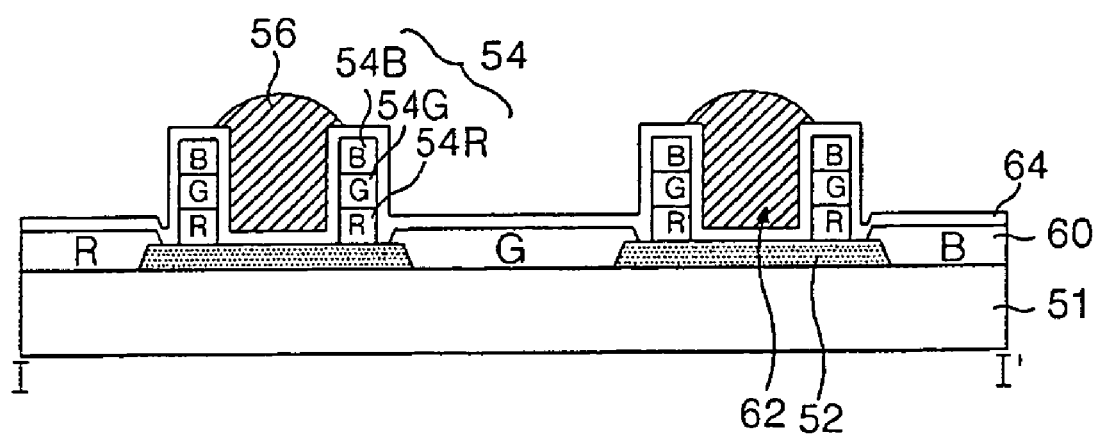
FIG. 5 is a sectional view representing the upper array substrate of the liquid crystal display panel taken along line I-I' in FIG. 4.

FIG. 4 is a plan view representing an upper array substrate according to a first embodiment of the present invention and FIG. 5 is a sectional view representing an upper array substrate of the liquid crystal display panel taken along line I-I' in FIG. 4.

Referring to FIGS. 4 and 5, the upper array substrate of the liquid crystal display panel includes a black matrix 52, a color filter 60, a color pattern 54, a common electrode 64 and a spacer 56 on an upper substrate 51.

The black matrix 52 is formed in a matrix on the upper substrate 51, partitions the upper substrate 51 into a plurality of cell regions at which the color filters 60 are to be formed and prevents the leakage of light between adjacent cells. This black matrix is formed so as to overlap with the area excluding the pixel electrode on the lower array substrate, that is, TFTs, gate lines, and data lines.

The color filter 60 is formed at the cell region partitioned by the black matrix 52. This color filter 60 is formed using separate red R, green Q and blue B filters to realize red, green, and blue colors.

The color pattern 54 is formed with a round or a polygon shape having a spacer hole 62. The color pattern 54 has at least two color patterns, which are different from each other, on the black matrix 52. Herein, for example, an explanation on the color pattern 54 in which a red color pattern 54R, a green color pattern 54G and a blue color pattern 54B are sequentially stacked will be made as follows. The red color pattern 54R is formed to have a first spacer hole on the black matrix 52. The green color pattern 54G has a second spacer hole overlapped with the first spacer hole and formed to have a width identical to that of the red color pattern 54R or a width smaller than that of the red color pattern 54R. The blue color pattern 54B has a third spacer hole overlapped with the second spacer hole and formed to have a width identical to the green color pattern 54G or a width smaller than that of the green color pattern 54G. Each of the red, the green and the blue patterns 54R, 54G and 54B is formed of a material identical to the red, the green and the blue color filters 60 and at the same time.

The common electrode 64 is formed on the upper substrate 51 provided with the color filter 60, the color pattern 54 and the black matrix 52. A reference voltage for driving the liquid crystal material is supplied to the common electrode 64.

The spacer 56 maintains the cell gap between the upper substrate and the lower substrate. The spacer 56 is formed on the upper substrate 51 so as to overlap with at least one of a gate line, a data line, and a TFT. At this time, the spacer material is dispensed into the spacer hole 62 arranged within the color pattern 54 by using the inkjet system and is spread out and then is hardened to thereby form the spacer 56.

As described above, the spacer of the liquid crystal display panel according to the first embodiment of the present invention is formed by filling the spacer material in the spacer hole of the color pattern simultaneously formed with the color filter. Accordingly, the spacer is formed at a desired non-display area by forming the spacer at the spacer hole arranged by the color pattern overlapped with the black matrix. Further, the spacer can be formed thicker than the height of the color pattern by forming the spacer using the inkjet system at the spacer hole in the color pattern. Thus, the costs of dedicated material may be reduced and the fabricating process may be simplified.

Figure 6A:
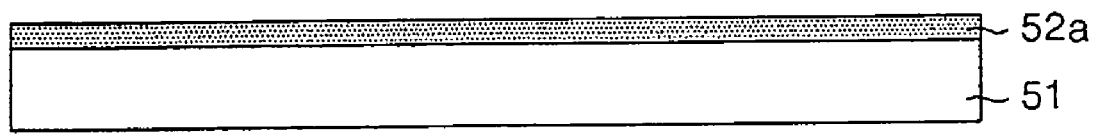
FIGS. 6A to 6C are sectional views illustrating a fabricating method of the black matrix shown in FIG. 5.
Figure 6B:
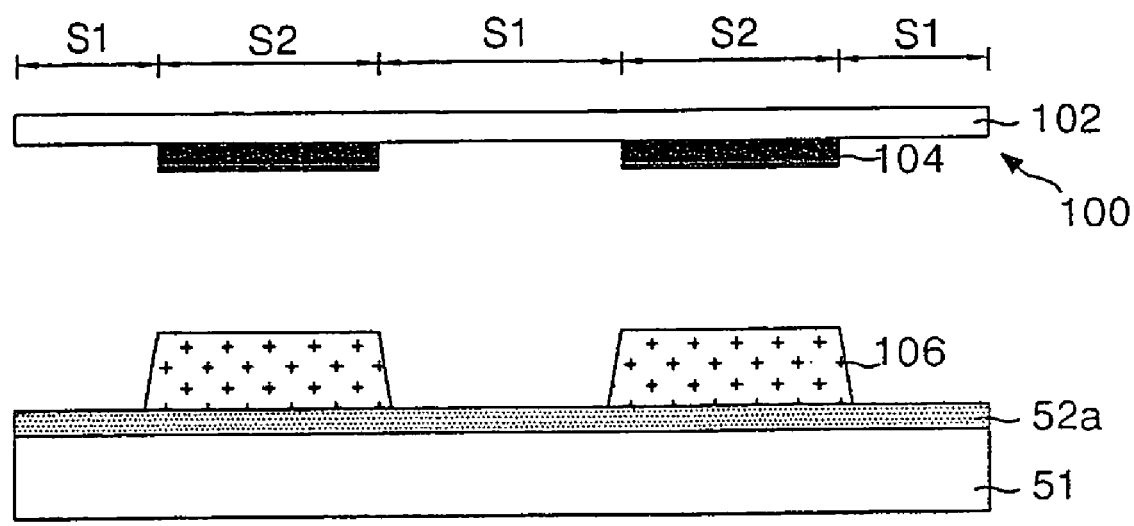
Figure 6C:
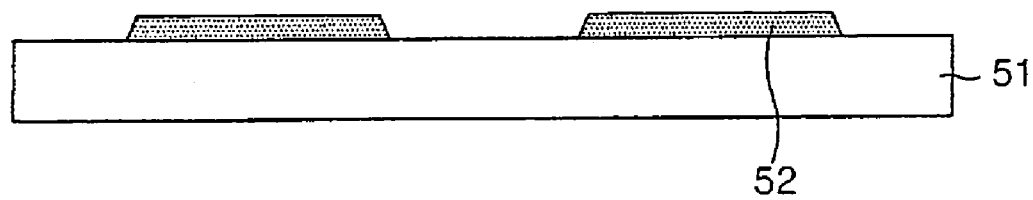

FIGS. 6A to 6C are configurations illustrating a fabrication method of the black matrix of the upper array substrate of the liquid crystal display panel according to the present invention.

Firstly, an opaque material 52a is entirely applied to the upper substrate 51, as shown in FIG. 6A. The opaque material 52a is made of an opaque metal including a chrome Cr or an opaque resin. Subsequently, a photo-resist is entirely formed on the opaque material 52a and then a first mask 100 is aligned on the upper potion of the upper substrate 51 as shown in FIG. 6B. The first mask 100 is made of a transparent substance and includes a mask substrate 102 in which an exposed area becomes an exposure area S1, and a shielding part 104 formed at a shielding area S2 of the mask substrate 102.

The photo-resist is exposed by using the first mask 100 and developed, so that a photo-resist pattern 106 is formed at the shielding area S2 corresponding to the shielding part 104 of the first mask 100. The opaque material 52a is patterned by an etching process using the photo-resist pattern 106, therefore, the black matrix 52 is formed as shown in FIG. 6C.

Figure 7A:
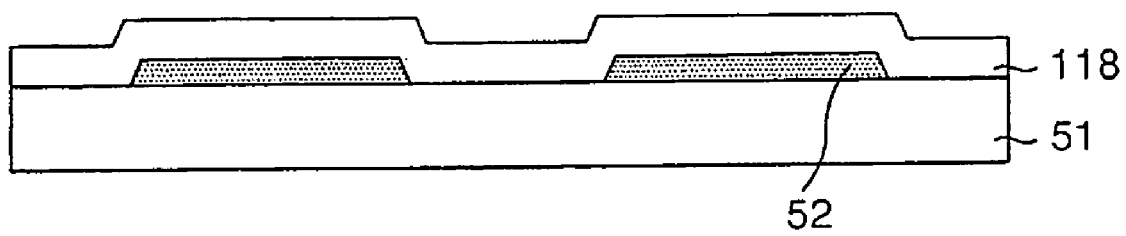
FIGS. 7A to 7C are sectional views illustrating the red color filter shown in FIG. 5 and a fabricating method thereof.
Figure 7B:
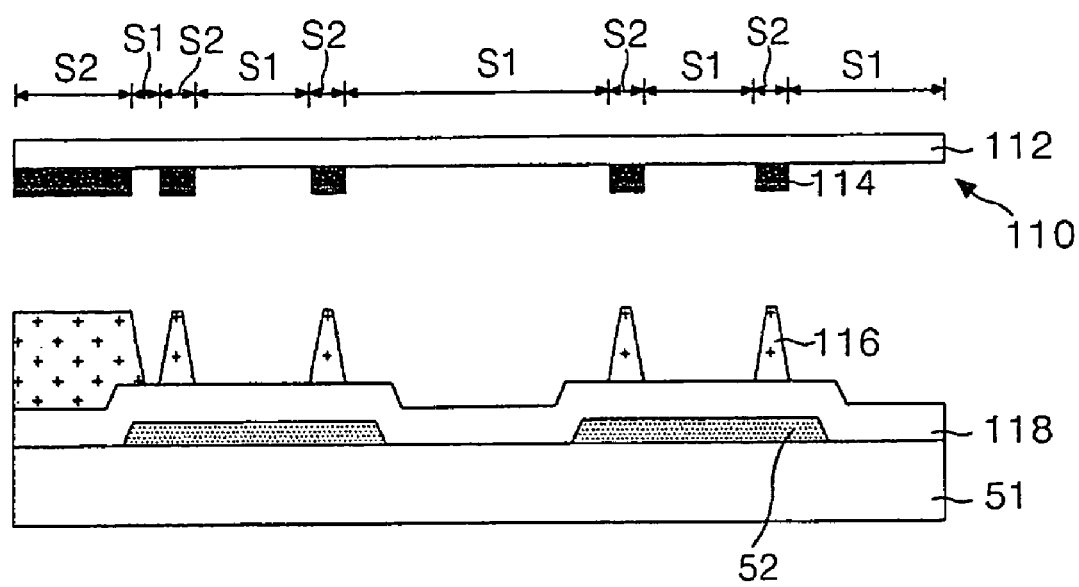
Figure 7C:
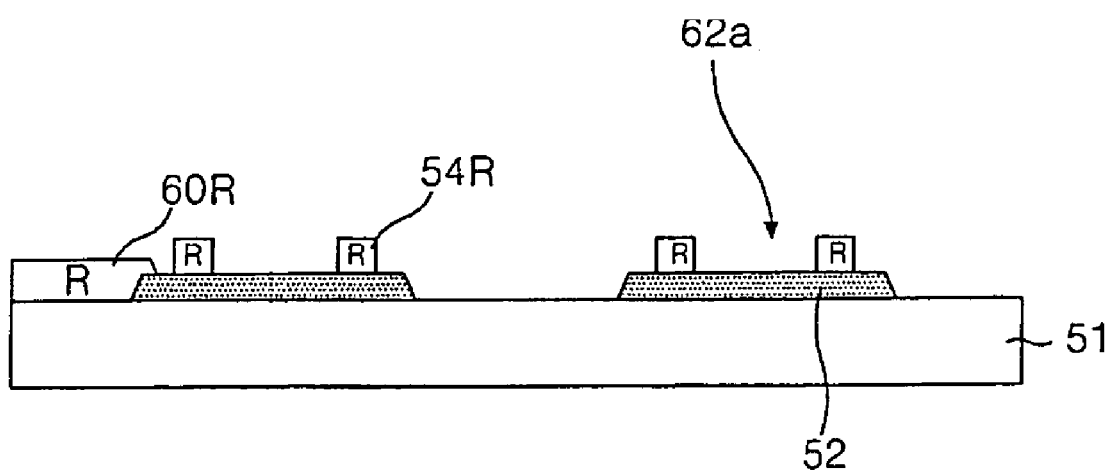

FIGS. 7A to 7C are sectional views illustrating a red color filter of the upper array substrate of the liquid crystal display panel according to the present invention and a fabrication method of the red color pattern.

Firstly, a red resin 118 is entirely deposited on the upper substrate 51 on which the black matrix 52 is formed, as shown in FIG. 7A. Subsequently, a photo-resist is entirely formed on the red resin 118 and then a second mask 110 is aligned on the upper potion of the upper substrate 51 as shown in FIG. 7B. The second mask 110 is made of a transparent substance and includes a mask substrate 112 in which an exposed area becomes an exposure area S1, and a shielding part 114 formed at a shielding area S2 of the mask substrate 112.

The photo-resist is exposed by using the second mask 110 and developed, so that a photo-resist pattern 116 is formed at the shielding area S2 corresponding to the shielding part 114 of the second mask 110. The red resin 118 is patterned by an etching process using the photo-resist pattern 116, therefore, a red color pattern 60R and a red color pattern 54R are formed as shown in FIG. 7C. The red color pattern 54R has a first spacer hole 62a and is formed so as to overlap with the black matrix 52.

Figure 8A:
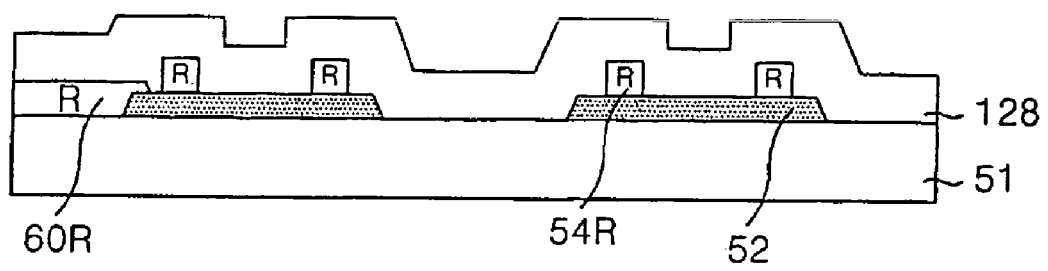
FIGS. 8A to 8C are sectional views illustrating the green color filter shown in FIG. 5 and a fabricating method thereof.
Figure 8B:
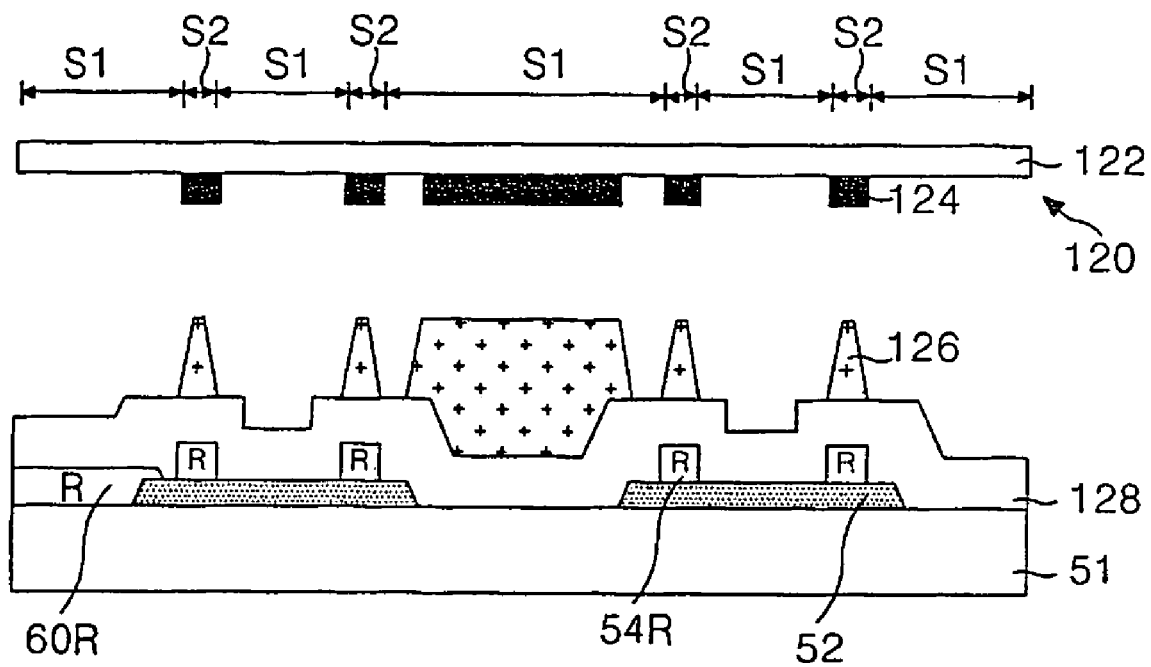
Figure 8C:
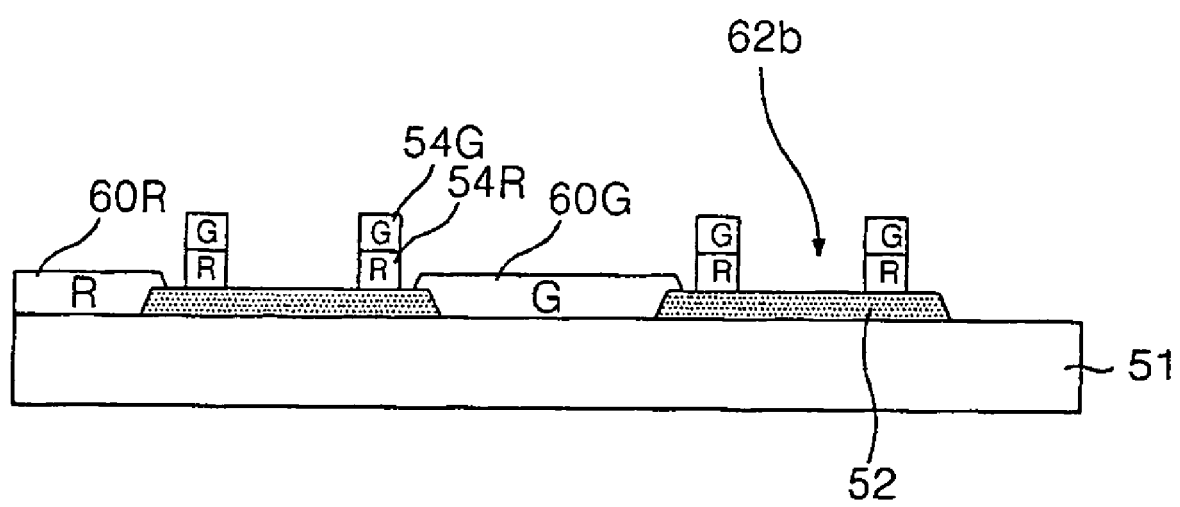

FIGS. 8A to 8C are sectional views illustrating a green color filter of the upper array substrate of the liquid crystal display panel and a fabricating method of the green color pattern according to the present invention.

Firstly, a green resin 128 is entirely deposited on the upper substrate 51 on which the red color filter 60R and the red color pattern 54R are formed, as shown in FIG. 8A. Subsequently, a photo-resist is entirely formed on the green resin 128 and then a third mask 120 is aligned on the upper potion of the upper substrate 51 as shown in FIG. 8B. The third mask 120 is made of a transparent substance and includes a mask substrate 122 in which an exposed area becomes an exposure area S1 and a shielding part 124 formed at a shielding area S2 of the mask substrate 122.

The photo-resist is exposed by using the third mask 120 and developed, so that a photo-resist pattern 126 is formed at the shielding area S2 corresponding to the shielding part 124 of the third mask 120. The green resin 128 is patterned by an etching process using the photo-resist pattern 126, therefore, a green color pattern 60G and a green color pattern 54G are formed as shown in FIG. 8C. The green color pattern 54G has a second hole 62b overlapped with the first spacer hole 62a and is formed so as to overlap with the red color pattern 54R.

Figure 9A:
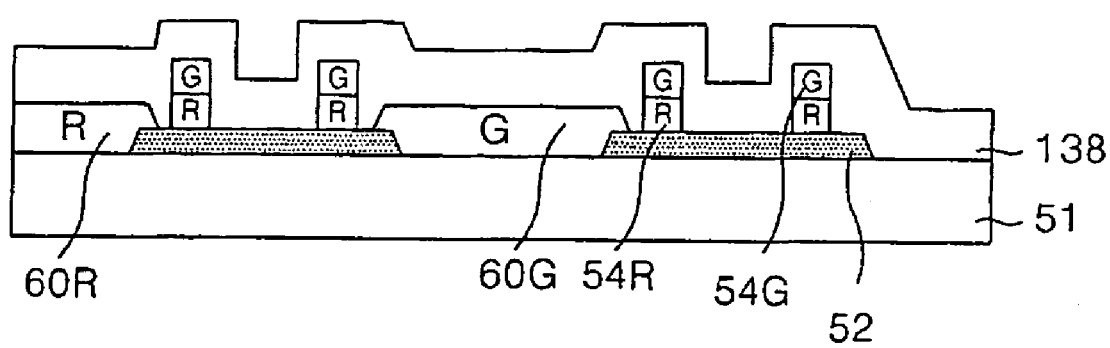
FIGS. 9A to 9C are sectional views illustrating the blue color filter shown in FIG. 5 and a fabricating method thereof.
Figure 9B:
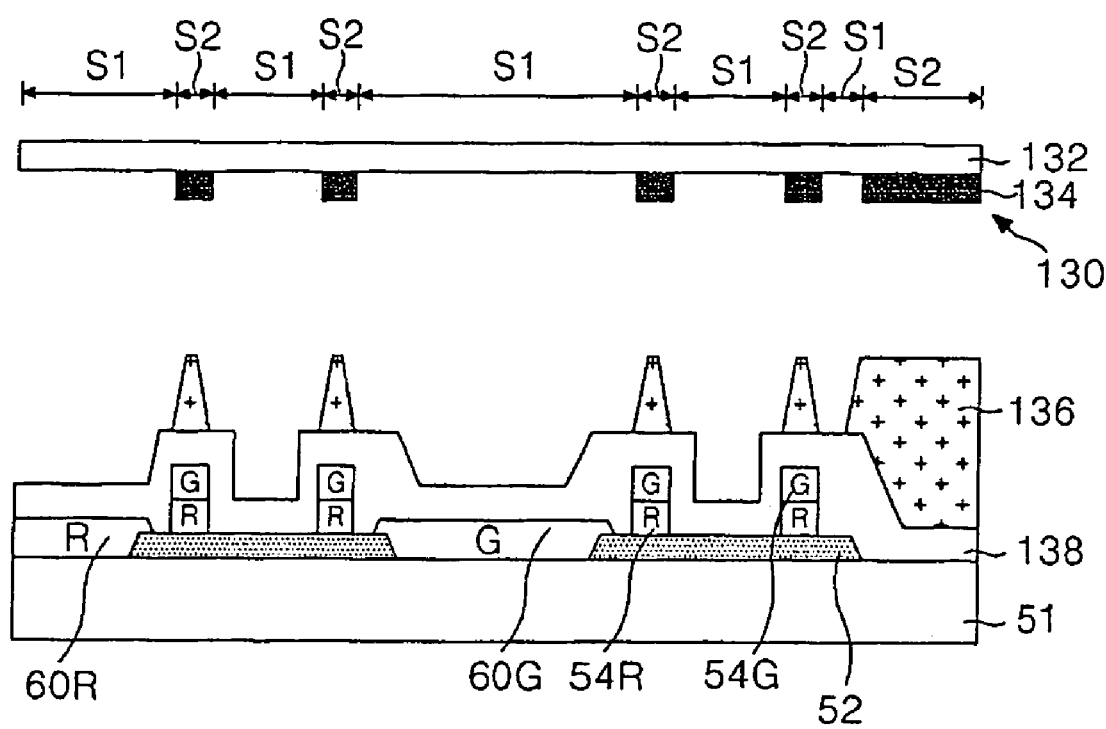
Figure 9C:
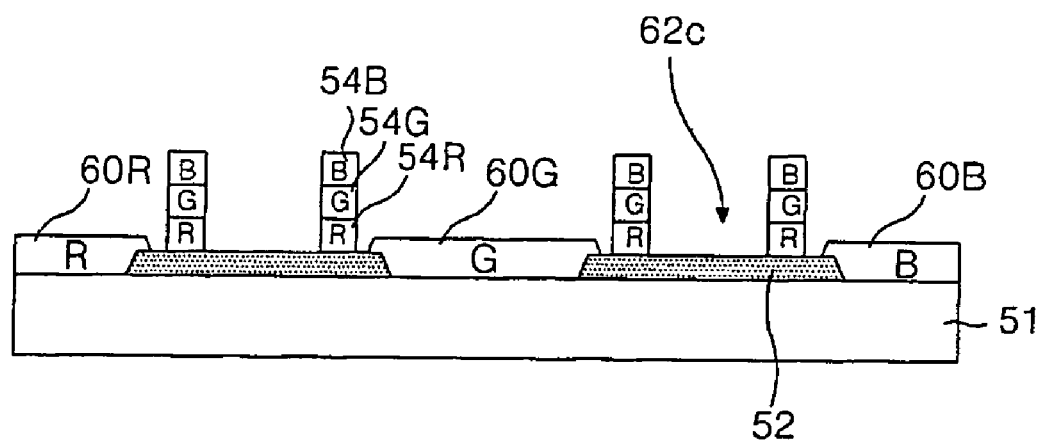

FIGS. 9A to 9C are sectional views illustrating a blue color filter of the upper array substrate of the liquid crystal display panel and a fabricating method of the blue color pattern according to the present invention.

Firstly, a blue resin 138 is entirely deposited on the upper substrate 51 on which the green color filter 60G and the green color pattern 54G are formed, as shown in FIG. 9A. Subsequently, a photo-resist is entirely formed on the blue resin 138 and then a fourth mask 130 is aligned on the upper potion of the upper substrate 51 as shown in FIG. 9B. The fourth mask 130 is made of a transparent substance and includes a mask substrate 132 in which an exposed area becomes an exposure area S1, and a shielding part 134 formed at a shielding area S2 of the mask substrate 132.

The photo-resist is exposed by using the fourth mask 130 and developed, so that a photo-resist pattern 136 is formed at the shielding area S2 corresponding to the shielding part 134 of the fourth mask 130. The blue resin 138 is patterned by an etching process using the photo-resist pattern 136, therefore, a blue color pattern 60B and a blue color pattern 54B are formed as shown in FIG. 9C. The blue color pattern 54B has a third spacer hole 62c overlapped with the first and the second spacer holes 62a and 62b, and is formed so as to overlap with the red and green color patterns 54R and 54G FIGS. 10A to 10C are sectional views illustrating a fabricating method of the common electrode and the spacer of the upper array substrate according to the present invention.

Figure 10A:
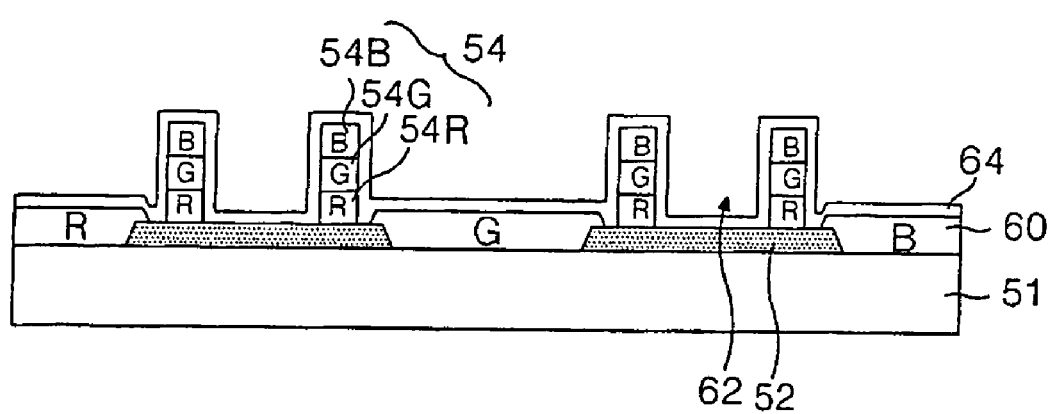
FIGS. 10A to 10C are sectional views illustrating a fabricating method of the common electrode and the spacer shown in FIG. 5.
Figure 10B:
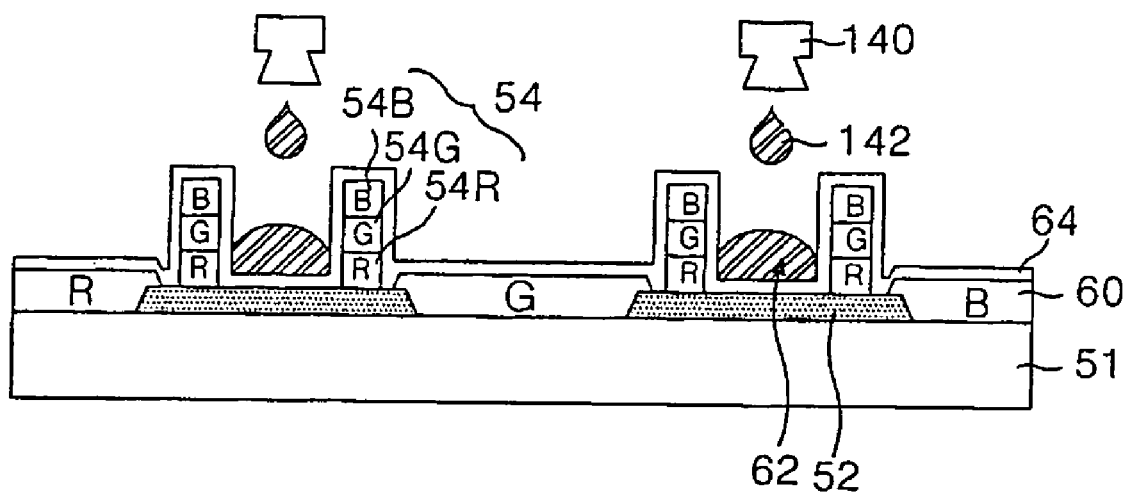
Figure 10C:
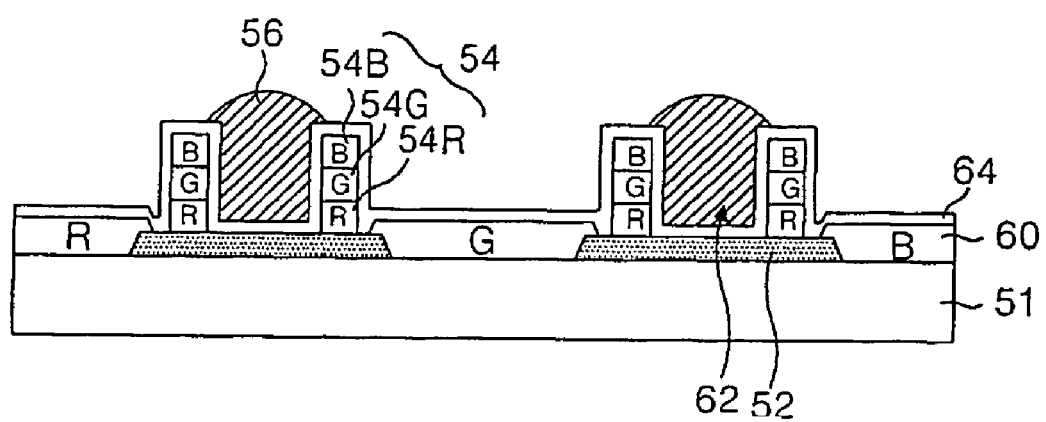

A transparent conductive material is deposited on the upper substrate 51 on which the color filter 60 and the color pattern 54 are formed by a deposition method such as sputtering, so that a common electrode 64 is formed as shown in FIG. 10A. The common electrode is made of a transparent conductive material including indium tin oxide ITO, indium zinc oxide IZO or indium Tin zinc Oxide ITZO.

Subsequently, an inkjet device 140 is aligned on the upper substrate 51 on which the common electrode 64 is formed. The inkjet device 140 spreads a spacer material 142 in the spacer hole 62 arranged by the color pattern 54 as shown in FIG 10B. The spacer material 142 spread in the spacer hole 62 is hardened at a designated temperature, so that a protruding spacer 54 is formed as shown in FIG. 10C.

Figure 11:
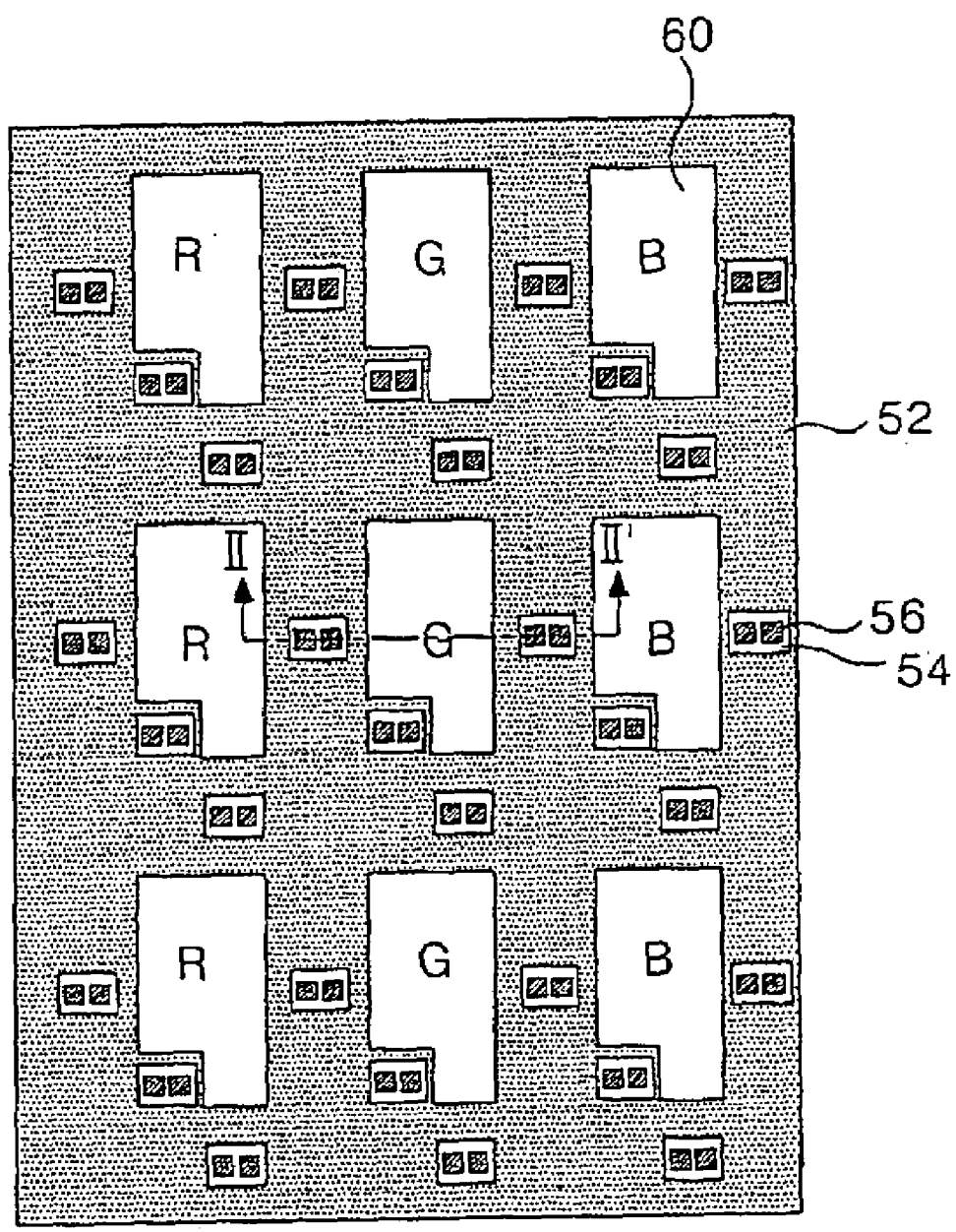
FIG. 11 is a plan view representing an upper array substrate according to a second embodiment of the present invention.
Figure 12:
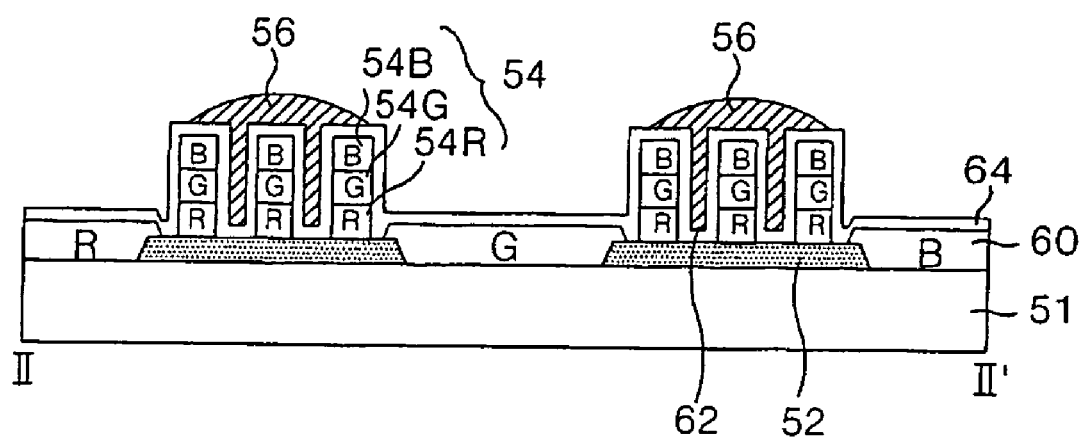
FIG. 12 is a sectional view representing the upper array substrate of the liquid crystal display panel taken along line II-II' in FIG. 11.

FIG. 11 is a plan view representing an upper array substrate of a liquid crystal display panel according to a second embodiment of the present invention and FIG. 12 is a sectional view representing an upper array substrate taken along line II-II' in FIG. 11.

Referring to FIGS. 11 and 12, the upper array substrate of the liquid crystal display panel includes identical constituent elements except that a plurality of spacer holes is formed in comparison with the upper array substrate as shown in FIGS. 4 and 5.

The color pattern 54 is formed having a plurality of spacer holes 62. The color pattern 54 has at least two color patterns, which are separate from each other, on the black matrix 52. Herein, for example, an explanation of the color pattern 54 on which a red color pattern 54R, a green color pattern 54G and a blue color pattern 54B are sequentially stacked will be made as follows. The red color pattern 54R is formed to have a plurality of first spacer holes on the black matrix 52. The green color pattern 54G has a plurality of second spacer holes overlapped with a plurality of first spacer holes and formed to have a width identical to that of the red color pattern 54R or a width smaller than that of the red color pattern 54R. The blue color pattern 54B has a plurality of third spacer holes overlapped with a plurality of second spacer holes and formed to have a width identical to that of the green color pattern 54G or a width smaller than that of the green color pattern 54G. Each of the red, the green and the blue patterns 54R, 54G and 54B is formed a material identical to the red, the green and the blue color filters 60 at the same time.

After a spacer material is spread out in the spacer holes 62 having a plurality of spacer holes, the spacer is formed by hardening. The spacer 56 maintains the cell gap between the upper substrate and the lower substrate. Herein, an entire width of the spacer holes 62 is relatively narrower than an entire width of one spacer hole shown in FIGS. 4 and 5. Accordingly, a height of spacer filled in the spacer holes 62 is relatively higher than a height of a spacer filled in one spacer hole, using a spacer material of an identical amount.

As described above, the spacer of the liquid crystal display panel according to the second embodiment of the present invention is formed by filling the spacer material in the spacer hole arranged by the color pattern simultaneously formed with the color filter. Accordingly, the spacer is formed at a desired non-display area by forming the spacer at the spacer hole arranged by the color pattern overlapped with the black matrix. Further, a spacer may be formed with a height greater than the height of the color pattern by forming the spacer using the inkjet system at the spacer hole arranged by color pattern. Thus the cost of material can be reduced and process may be simplified.

On the other hand, the color pattern according to the present invention is formed in a dot unit and may be formed with a line shape to correspond to a gate line or a data line. Further, it has been explained that the color pattern according to the present invention is stacked in order of the red, green and blue color pattern but the color patterns may be stacked in any order, so that the color pattern is formed with various types. In addition, the liquid crystal display panel according to the present invention is provided with the common electrode on the upper substrate to thereby be applicable to a twisted nematic (TN) mode having a vertical electric field with a pixel electrode formed on a lower substrate and a in-plane switching (IPS) mode having a horizontal electric field by forming the common electrode and the pixel electrode on the lower substrate.

As described above, according to a liquid crystal display panel and a fabricating method thereof, the spacer is formed to have a designated height by filling the spacer material in at least more than one spacer hole arranged by the color pattern simultaneously formed with the color filter. Accordingly, because a spacer material is spread in the spacer hole arranged by a color pattern overlapped with a black matrix by using an inkjet system, it is possible to achieve an accurate formation of the spacer. Therefore, it is possible that a spacer is formed at a desired non-display area. Further, it is possible that the spacer is formed with a height greater than the height of a color pattern by forming a spacer using an inkjet system at a spacer hole arranged by a color pattern. Thus, the costs of dedicated material may be reduced, and the fabricating process may be simplified.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display panel comprising:
   a black matrix on an upper substrate;
   a color pattern having at least one hole on the black matrix;
   a spacer protruding from the at least one hole, and
   a color filter at each area partitioned by the black matrix.

2. The liquid crystal display panel of claim 1, wherein the color pattern has a structure having at least two layers.

3. The liquid crystal display panel of claim 2, wherein the color pattern is formed by stacking a red color pattern, a green color pattern and a blue color pattern.

4. The liquid crystal display panel of claim 2, wherein a width of the color pattern narrows from an uppermost layer to a lowermost layer.

5. The liquid crystal display panel of claim 2, wherein the color pattern has an identical width in each layer.

6. The liquid crystal display panel of claim 1, wherein the color pattern has a width less than that of the black matrix.

7. The liquid crystal display panel of claim 1, further comprising a common electrode located between the color filter and the spacer.

8. The liquid crystal display panel of claim 1, wherein the spacer is formed by using an inkjet system.

9. A method of fabricating a liquid crystal display panel comprising:
   forming a black matrix on a substrate;
   forming a color filter at each area partitioned by the black matrix;
   forming a color pattern having at least one hole on the black matrix; and
   forming a spacer protruding from the at least one hole.

10. The method of claim 9, wherein the color pattern has a structure having at least two layers.

11. The method of claim 10, wherein a width of the color pattern narrows from an uppermost layer to a lowermost layer.

12. The method of claim 10, wherein the color pattern has an identical width in each layer.

13. The method of claim 9, wherein the step of forming the color pattern includes:
   forming a red color pattern on the black matrix;
   forming a green color pattern on the red color pattern; and
   forming a blue color pattern on the green color pattern.

14. The method of claim 9, wherein the color pattern is formed to have a width less than that of the black matrix.

15. The method of claim 9, further comprising forming a common electrode located between the color filter and the spacer.

16. The method of claim 9, wherein forming a spacer includes dispensing spacer material using an inkjet system.

* * * * *